(No Model.)

D. AMMERMAN, T. BAIRD & E. M. FOREMAN.
TIRE COOLER.

No. 254,897. Patented Mar. 14, 1882.

WITNESSES:
Donn Twitchell
C. Sedgwick

INVENTOR:
D. Ammerman
T. Baird
E. M. Foreman
BY
ATTORNEYS.

UNITED STATES PATENT OFFICE.

DORA AMMERMAN, THOMAS BAIRD, AND EBENEZER M. FOREMAN, OF FAIRMOUNT, ILLINOIS.

TIRE-COOLER.

SPECIFICATION forming part of Letters Patent No. 254,897, dated March 14, 1882.

Application filed August 26, 1881. (No model.)

*To all whom it may concern:*

Be it known that we, DORA AMMERMAN, THOMAS BAIRD, and EBENEZER M. FOREMAN, of Fairmount, in the county of Vermillion and State of Illinois, have invented a new and Improved Tire-Cooler, of which the following is a specification.

This invention consists of a suitable wheel-supporting rack or bed fixed on connected rocking bars of novel design within a water-box in such a manner that the wheel-rack can be elevated or depressed at will by means of a lever, whereby a wheel, with its heated tire, may be plunged into and raised out of the water in the said box, and the tire thereby quickly and evenly cooled.

Reference is to be had to the accompanying drawings, forming part of this specification, in which similar letters of reference indicate corresponding parts in all the figures.

Figure 1:
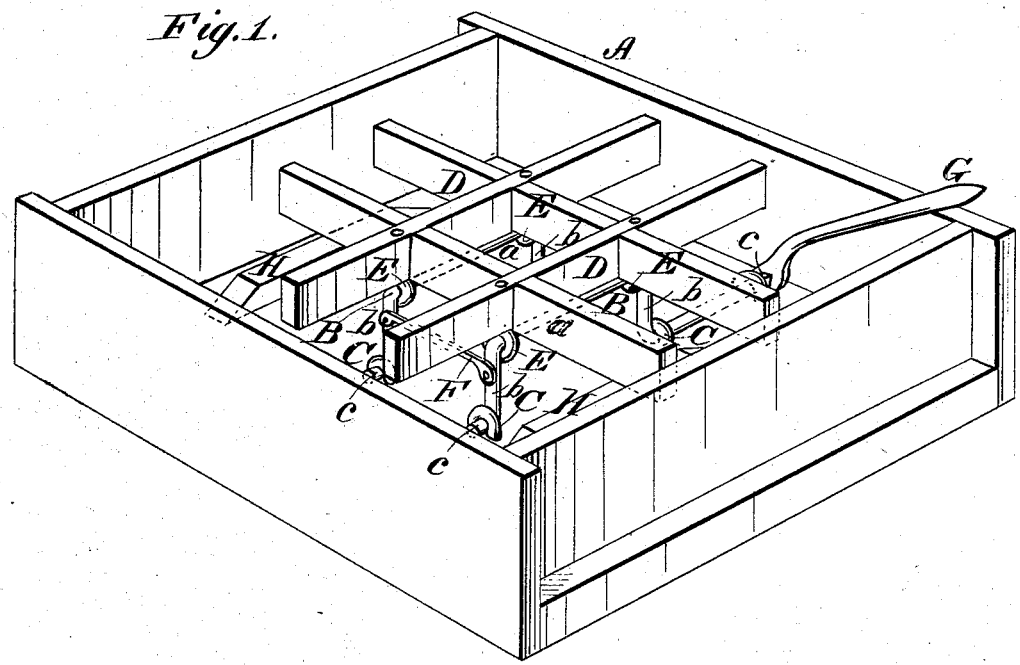
Figure 2:
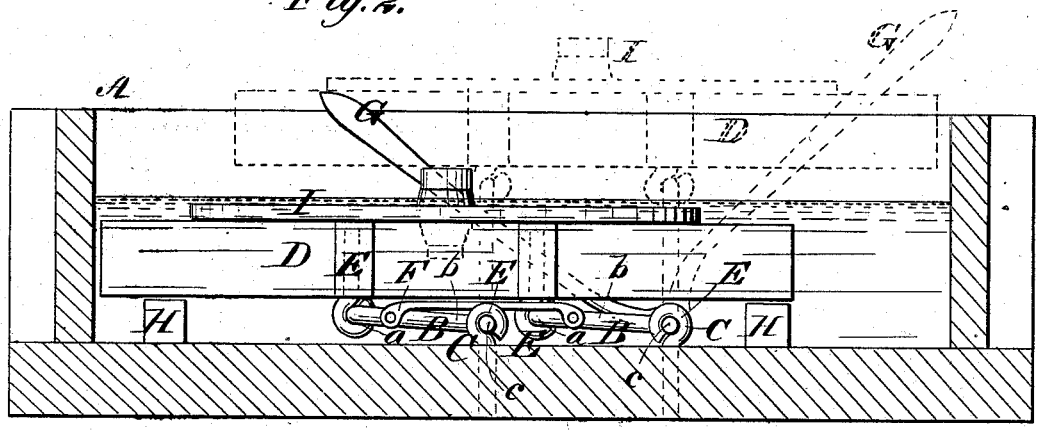

Figure 1 is a perspective view of our improved device. Fig. 2 is a sectional side elevation of the same, showing a wheel in position.

A represents a box, which may be of rectangular or other convenient shape, designed to contain water for cooling the wheel-tire. In this box A two parallel rocking bars, B B, are journaled a short distance apart, in eyebolts, hinges, or staples C C, that are fixed in the box-bottom. From their straight central sections, $a$, said bars B are at each end bent down at right angles, as shown at $b$, and their extremities $c$ are then bent out at right angles to the parts $b$ and parallel with the parts $a$, and it is these extremities or arms $c$ that are journaled in the eyebolts, hinges, or staples C C.

To the straight central sections, $a$, the rack or bed D, which is composed of rectangularly-crossed timbers mortised into each other, is attached by eyebolts, hinges, or staples E E, that project down from the under side of said rack D.

The two bars B B may, if desired, be also coupled or connected with each other by rods F, that are pivoted on their sections $b$. An arm, $c$, of one of these bars B is extended nearly to a side of the box A, so that the lever G may readily be attached thereto for the working of the device by an attendant.

In the bottom of the box A are fixed two parallel leveling-bars, H, which are intended to level the rack D as it descends, and to form a support therefor when depressed. The parts being in place, as shown in Fig. 1, a wheel, I, is laid flat on the rack D, with the wheel-hub projecting down through the central opening in said rack D, as shown in Fig. 2. The lever G is then moved to the position shown in full lines, Fig. 2, and the bars B B are thereby turned down, as shown in Fig. 2, carrying with them the rack D and wheel I beneath the water M, whereby the wheel-tire is evenly cooled, the said rack D and wheel I being immersed in a horizontal position, as shown. In the progress of this downward movement of the rack D, should either end be tipped out of level, it will be restored to level by contact with the leveling-bars H, which are arranged as shown, so as to support the rack D, and also to afford space between them for the folding down of the rocking bars B, as shown in Fig. 2. On turning the lever G up, as shown in Fig. 1, and in dotted lines, Fig. 2, the rack D, with the supported wheel I, is raised above the water M to permit the easy removal of the wheel.

The device is simple and cheap of construction, very effective, and easily operated.

We are aware that Patent No. 181,740 describes connected arms and shaft pivoted at the bottom of tank, so as to raise, lower, and sustain the wheel-supporting platform; but the mode of operation is different from ours, the motion being perpendicularly up and down, while ours is backward and forward, so as to dispense with the use of friction-rolls on the ends of the supporting-arms, as shown in said patent. These rolls are expensive, and require skilled workmen to make them, while any blacksmith can make our raising and lowering mechanism with the scraps of iron usually found in his shop. In the patented tire-cooler referred to the lifting and lowering mechanism receives the strain of the whole weight of the tire and supporting-platform when said mechanism is folded on the bottom, the rods or bars being thus bent out of their proper shape, and the pivots bent so as not to turn readily. This is avoided by our leveling-bars H, which are arranged to bear the weight and take the strain.

Having thus fully described our invention, we claim as new and desire to secure by Letters Patent—

1. The parallel rocking bars B B, having cranks with journals working in staples C, in combination with the rack D, connected by eyebolts E with the parts $a$ of the rocking bars, as shown and described.

2. The combination, with the rocking-bars B B, of the parallel leveling-bars H, arranged on opposite sides and in the bottom of box, as and for the purpose specified.

DORA AMMERMAN.
  THOMAS BAIRD.
  EBENEZER M. FOREMAN.

Witnesses:
 J. K. JAMES,
 REUBEN JACK.